US012800459B2

(12) United States Patent
Barbosa De Aguiar et al.

(10) Patent No.: US 12,800,459 B2
(45) Date of Patent: Nov. 17, 2026

(54) APPARATUS FOR DETECTING CHEMICALS IN A SAMPLE

(71) Applicants: CENTRE NATIONAL DE LA RECHERCHE SCIENTIFIQUE, Paris (FR); COLLEGE DE FRANCE, Paris (FR); ECOLE NORMALE SUPERIEURE, Paris (FR); SORBONNE UNIVERSITE, Paris (FR)

(72) Inventors: Hilton Barbosa De Aguiar, Vitry-sur-seine (FR); Claudio Bruschini, Villars-sous-Yens (CH); Edoardo Charbon, Jouxtens-Mézery (CH); Samuel Burri, Ravensburg (DE)

(73) Assignees: CENTRE NATIONAL DE LA RECHERCHE SCIENTIFIQUE, Paris (FR); COLLEGE DE FRANCE, Paris (FR); ECOLE NORMALE SUPERIEURE, Paris (FR); SORBONNE UNIVERSITE, Paris (FR)

( * ) Notice: Subject to any disclaimer, the term of this patent is extended or adjusted under 35 U.S.C. 154(b) by 93 days.

(21) Appl. No.: 18/850,207

(22) PCT Filed: Mar. 24, 2023

(86) PCT No.: PCT/EP2023/057646
§ 371 (c)(1),
(2) Date: Sep. 24, 2024

(87) PCT Pub. No.: WO2023/180532
PCT Pub. Date: Sep. 28, 2023

(65) Prior Publication Data

US 2025/0216306 A1 Jul. 3, 2025

(30) Foreign Application Priority Data

Mar. 25, 2022 (EP) .................................... 22305370

(51) Int. Cl.
*G01N 3/44* (2006.01)
*G01J 3/02* (2006.01)
(Continued)

(52) U.S. Cl.
CPC ................ *G01N 3/44* (2013.01); *G01J 3/021* (2013.01); *G01J 3/0229* (2013.01); *G01J 3/2803* (2013.01); *G01J 3/30* (2013.01)

(58) Field of Classification Search
CPC ............. G01N 3/44; G01N 2201/0675; G01N 2201/10; G01N 21/65; G01J 3/021;
(Continued)

(56) References Cited

U.S. PATENT DOCUMENTS

2006/0197947 A1* 9/2006 Wang .................... G01N 21/65 356/301
2010/0291599 A1 11/2010 Tague, Jr. et al.
(Continued)

OTHER PUBLICATIONS

International Search Report and Written Opinion issued on Jun. 9, 2023, in corresponding International Application No. PCT/EP2023/057646, 12 pages.
(Continued)

*Primary Examiner* — Tarifur R Chowdhury
*Assistant Examiner* — Kemaya Nguyen
(74) *Attorney, Agent, or Firm* — Maier & Maier, PLLC

(57) ABSTRACT

An apparatus for detecting one or more chemicals in a sample, the apparatus including: a scanning unit including a light source configured to scan the sample using a light beam having a linear-shaped illumination; a dispersive element configured to receive light from the sample and disperse the received light spatially in a parallel manner; a spatial light
(Continued)

modulator configured to receive the dispersed light and select one or more wavelength bands of the dispersed light; and a detection unit including a one-dimensional array of detectors configured to receive the selected one or more wavelength bands and detect the one or more chemicals in the sample based on the selected one or more wavelength bands, each detector of the array of detectors being a photon detector having a detection surface having a dimension below 50 μm, the dimension being in a direction of the linear-shaped illumination.

10 Claims, 2 Drawing Sheets

(51) Int. Cl.
*G01J 3/28* (2006.01)
*G01J 3/30* (2006.01)

(58) Field of Classification Search
CPC .......... G01J 3/0229; G01J 3/2803; G01J 3/30; G01J 3/32; G01J 3/44
See application file for complete search history.

(56) References Cited

U.S. PATENT DOCUMENTS

2014/0107944 A1* 4/2014 Ben-Amotz .......... G01N 21/65 702/30
2020/0284657 A1* 9/2020 Leblond ................ G01J 3/0289
2022/0042916 A1* 2/2022 Notingher .............. G02B 21/16
2022/0057263 A1 2/2022 Kersey et al.

OTHER PUBLICATIONS

Scotté et al., "Spontaneous Compressive Raman technology: developments and applications", Optics [physics. optics], 2021, Université d'Aix-Marseille, pp. 1-219.

Sinjab et al., Applications of Spatial Light Modulators in Raman Spectroscopy, Applied Spectroscopy, 2019, vol. 73, No. 7, pp. 727-746.

Gentner et al., "Compressive Raman Microspectroscopy Parallelized by Single-Photon Avalanche Diode Arrays", arXiv:2301.07709v1 [physics.ins-det], Jan. 18, 2023, pp. 1-4.

Burri et al., "LinoSPAD: A Compact Linear SPAD Camera System with 64 FPGA-Based TDC Modules for Versatile 50 ps Resolution Time-Resolved Imaging", Instruments, The Authors MDPI, Dec. 5, 2017, vol. 1, No. 6, 21 pages.

* cited by examiner

APPARATUS FOR DETECTING CHEMICALS IN A SAMPLE

FIELD

The present invention relates to optical apparatuses, and more particularly to using optical apparatus for measuring chemical properties.

BACKGROUND

Raman scattering emission is widely used to identify chemicals based on the inelastic scattering of photons by the chemicals. However, chemical detection using Raman scattering emission may involve large data size which requires time consuming acquisition and post-processing. Solutions exist to limit the size of data acquired in Raman scattering experiments, by for example performing optical post-processing and selecting wavelengths which are transmitted to a detector. For example, U.S. Pat. No. 9,476,824 discloses a method for measuring Raman-scattered light intensity transmitted through programmable binary optical mathematical filters designed to minimize the error in the chemical classification (or concentration) variables of interest. The theoretical results are implemented and validated using a digital compressive detection instrument that incorporates a diode excitation laser having a spot-shaped illumination, digital micromirror device (DMD) spatial light modulator, and single photon counting photodiode detector.

However, the speed of chemical analysis of the existing solutions is still limited by the detector, such as optical array (e.g. charge-coupled device or "CCD") in conventional Raman spectroscopy or using a single-pixel detector in experiments using programmable optical filters. In particular, the speed of the chemical analysis experiment is limited by the detector size, readout and response time. The existing solutions do not enable performing in-vivo imaging due to motion artefacts such as respiratory movement, blood flow, cells and organelles movement inside cells.

SUMMARY

These problems are solved or mitigated by the claimed apparatus and method.

Instead of using a spot-shaped illumination, according to the present invention, a linear-shaped illumination is used, enabling fast scanning of a sample. Additionally, a digital micromirror device is combined with a one-dimensional array of detectors, such as single-pixel detectors. Therefore, by combining a linear-shaped illumination with a digital micromirror device enabling the selection of wavelengths in one direction and a one-dimensional array of detectors in a perpendicular direction, each single-pixel detector in the array is adapted to detect chemicals simultaneously, improving the chemical analysis speed and enabling high-speed experiments necessary, for example, in high-speed chemical screening applications (e.g in pharmaceutical or cytometry applications) and in-vivo imaging.

A first aspect of the invention provides an apparatus for detecting one or more chemicals in a sample, the apparatus comprising: a scanning unit comprising a light source configured to scan the sample using a light beam having a linear-shaped illumination; a dispersive element configured to receive light from the sample and disperse the received light spatially in a parallel manner; a spatial light modulator configured to receive the dispersed light and select one or more wavelength bands of the dispersed light; and a detection unit comprising a one-dimensional array of detectors configured to receive the selected one or more wavelength bands and detect the one or more chemicals in the sample based on the selected one or more wavelength bands, each detector of the array of detectors being a photon detector having a detection surface having a dimension below 50 μm, the dimension being a dimension in a direction of the linear-shaped illumination.

Optionally, the scanning unit is configured to scan the sample with a scanning direction which is different from a direction of the linear-shaped illumination.

Optionally, the dispersive element is on a plane having a first direction corresponding to the direction of the linear-shaped illumination and a second direction corresponding to the scanning direction.

Optionally, the dispersive element is a planar grating.

Optionally, the scanning unit is configured to use a raster scan to scan the sample using the light beam.

Optionally, the detectors are single-photon avalanche diode detectors.

Optionally, the spatial light modulator comprises a digital micromirror device.

Optionally, the spatial light modulator is configured to select N wavelength bands and the one-dimensional array of detectors comprises M detectors, each of the M detectors being configured to receive a respective wavelength band of the N wavelength bands.

Optionally, the spatial light modulator comprises at least N mirrors configured to direct the N wavelength bands towards the M detectors.

Optionally, the N wavelength bands comprise spectra corresponding to each of the one or more chemicals.

Optionally, the spatial light modulator is configured to use one or more binary mathematical filters to filter the spectra, each of the one or more binary mathematical filters corresponding to each of the one or more chemicals.

Optionally, the light received from the sample includes Raman-scattered light.

A second aspect of the invention provides a method for parallel detection of one or more chemicals in a sample, the method comprising: scanning the sample using a light beam having a linear-shaped illumination; receiving light from different points of the sample at a dispersive element and dispersing the received light spatially using the dispersive element; receiving the dispersed light at a spatial light modulator and selecting one or more wavelength bands of the dispersed light using the spatial light modulator; and receiving the selected one or more wavelength bands at a one-dimensional array of detectors and detecting the one or more chemicals in the sample based on the selected one or more wavelength bands using the one-dimensional array of detectors, each detector of the array of detectors being a photon detector having a detection surface having a dimension below 50 μm, the dimension being in a direction of the linear-shaped illumination. The small dimension of the detector enables scaling up the M detectors considerably, hence the acquisition speed.

BRIEF DESCRIPTION OF THE DRAWINGS

Embodiments of the invention will now be described with reference to the accompanying drawings, in which.

DETAILED DESCRIPTION

Figure 1A:
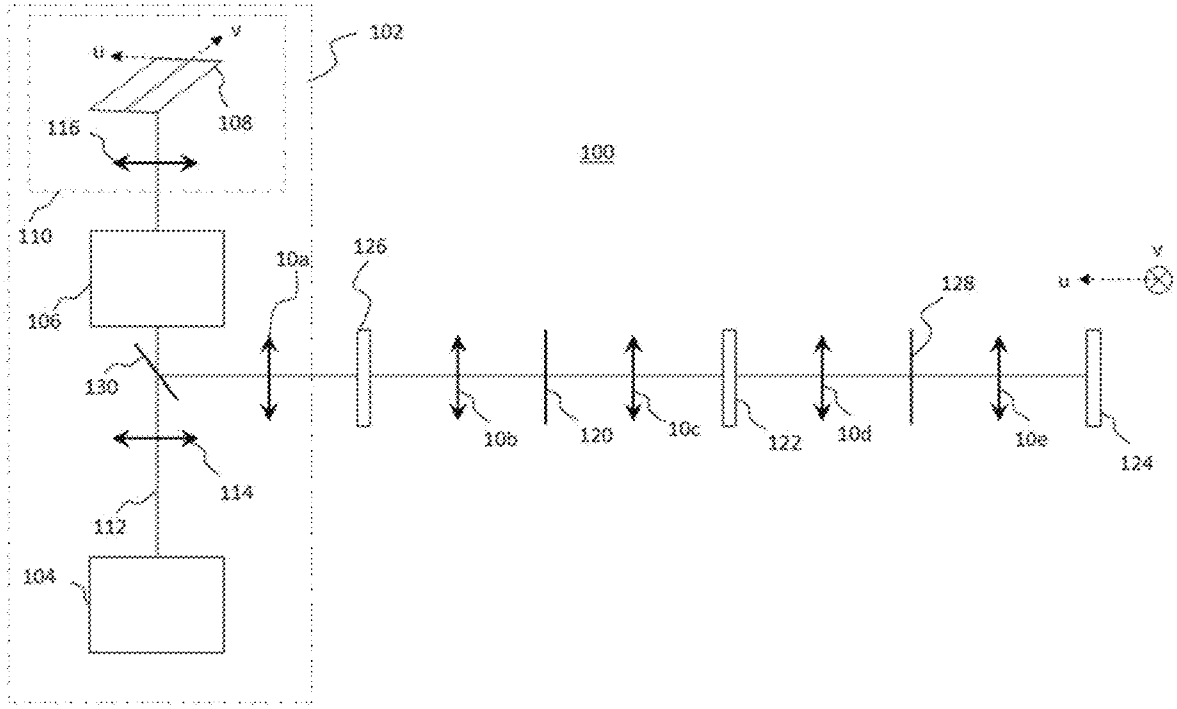
FIG. 1*a* is a schematic of an apparatus for detecting one or more chemicals in a sample according to an example.

FIG. 1*a* is a schematic of an apparatus 100 for detecting one or more chemicals in a sample, according to an example. FIG. 1*a* is a two-dimensional representation of the apparatus 100.

The sample 108 may comprise for example biological tissues or cells, and the apparatus 100 may be used to detect chemicals, such as DNA, protein or lipid. In an example, the apparatus 100 may be used to detect chemicals in an in-vivo experiment such as respiratory movement or blood flow. The apparatus 100 comprises a scanning unit 102 comprising a light source 104 configured to scan the sample 108 using a light beam 112 having a linear-shaped illumination. The light source may be for example a continuous wave (CW) laser. For example, the CW laser may emit a light beam 112 at 532 nm. The scanning unit 102 comprises a microscope 110 which comprises an objective 116. The microscope may also comprise one of more lenses (not shown) enabling to focus the light beam 112 on a back focal plane of the objective 114, the sample 108 being placed in the microscope 110, at the focal plane. The scanning unit 102 comprises a cylindrical lens 114 which is used to obtain a linear-shaped illumination to scan the sample 108. In particular, the cylindrical lens 114 enables focusing the light received from the light source 104 within a single axis v.

Additionally, the scanning unit 102 may comprise a scanning system 106, which may be an automated scanning system. The scanning system 106 may be used to control a scan of the sample 108. For example, the scanning system 106 may define patterns such as a raster scan in order to scan the sample 108 with the linear-shaped illumination. For example, the scanning system 106 may comprise galvanometric mirrors which are used to scan the sample automatically. In another example, the sample may be scanned by moving the sample (for example, the sample may be placed on a moving stage). Additionally, the scanning system 106 may define the scanning speed or an area of the sample 108 to scan. The linear-shaped illumination may correspond to a dimension of the sample 108 (e.g. a length or width of the sample 108) and may have a direction v which is perpendicular to a side of the sample 108. However, in another example, the linear-shaped illumination may have a dimension different from a dimension of the sample 108 and may have a direction which is different from the sides of the sample 108. The length of the cylindrical lens 114 defines the dimension of the linear-shaped illumination, which in turn can define the scanning speed. In particular, the cylindrical lens 114 can be optimized so that the dimension linear-shaped illumination corresponds to a longest dimension of the sample 108. In other words, the length of the cylindrical lens 114 can be adapted to the area of the sample 108 to scan.

In an example, the scanning unit 102 may be configured to scan the sample 108 with a scanning direction u which is different from a direction v of the linear-shaped illumination. The direction u may be perpendicular to the direction v. Alternatively, the direction u and the direction v may have an angle which is different from 90. Additionally or alternatively, the scanning unit 102 may be configured to scan the entire surface of the sample 108, or one or more portions of the sample 108, defined by the scanning system 106. For example, the linear-shaped illumination may have a dimension corresponding to a length or width of the sample 108.

The scanning system 106 may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. When a hardware device is a computer processing device (e.g. CPU, a controller, an ALU, a digital signal processor, a microcomputer, a microprocessor, etc.), the computer processing device may be configured to carry out program code by performing arithmetical, logical, and input/output operations, according to the program code. Each unit may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media.

As shown in FIG. 1*a*, a slit 126 may be used to control the amount of light that is able to reach the detectors 124. For example, the aperture of the slit 126 may be modified to increase or decrease the amount of transmitted light to the detectors 124. In this example, the slit 126 may be placed between the dichroic mirror 130 and the detectors 124.

Further, the apparatus 100 comprises a dispersive element 120 configured to receive light from the sample 108 and spectrally disperse the received light spatially in a parallel manner. In particular, the light beams dispersed are parallel to each other. The light received from the sample 108 may include for example Raman-scattered light. In this example, the apparatus 100 comprises a dichroic mirror 130 which is used to separate the light received from the light source 104 and the light received from the sample 108 (e.g. Raman-scattered or fluorescence light). The dispersive element 120 may be for example a grating, such as a planar holographic grating. In another example, the dispersive element 120 may be a volume holographic grating or a prism. The dispersive element 120 is on a plane having a first direction y a second direction x. For example, the first direction y may correspond to the direction of the linear-shaped illumination v and the second direction x may correspond to the scanning direction u. This configuration ensures that the light received from the sample 108 is dispersed by the dispersing element 120 while scanning the entire sample 108.

The dispersed light is then received by a spatial light modulator 122. For example, the dispersed light may be collimated with a lens 10*c* and focused on the spatial light modulator 122. The spatial light modulator 122 may comprise for example a digital micromirror device (DMD) (for binary amplitude modulation). In another example, the spatial light modulator 122 may be a liquid crystal (for analogue amplitude and/or phase modulation). The dispersive element 120 enables dispersing the light on the surface of the DMD, and therefore on several mirrors of the DMD. For example, the DMD 122 may comprise an array of 1920×1080 aluminum mirrors (10.8 μm pitch) that can tilt±12° relative to the flat state of the array, controlled by an interface card. The spatial light modulator 122 may comprise a processor or a controller. In another example, the DMD 122 and the scanning system 106 may be implemented the same hardware and/or software. The DMD 122 is configured to select one or more wavelength bands of the dispersed light. In particular, the mirrors in each column of the array are set to a same angle, and the columns are divided into adjacent groupings (note that the roles of rows and columns can be interchanged). For example, to separate the photons into 128 "bins", the bins being defined by bands of photon energy, then groups of 15 adjacent columns are set in unison.

Figure 1B:
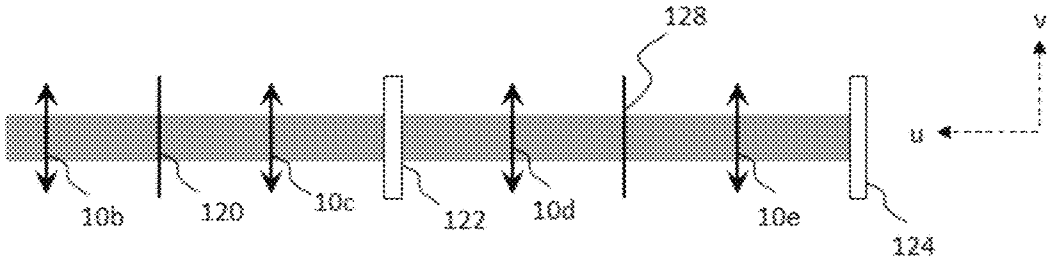
FIG. 1*b* is a schematic of a portion of an apparatus for detecting one or more chemicals in a sample according to an example.

As illustrated in FIG. 1*a* which is represented with a view perpendicular to the light dispersion and FIG. 1*b* which is represented with a view parallel to the light dispersion, the DMD 122 is mounted perpendicular to the dispersed light direction v in order to spatially separate the incident and reflected photons. Therefore, the light (for example Raman-scattered light) received at the DMD 122 is separated in selected wavelengths bands, and the selected wavelength bands are received by a detection unit 124. In an example, the reflected photons are recombined in a second dispersive element 128, and focused onto the detection unit 124. In particular, the second dispersive element 128 enables imaging the received linear-shaped reflecting photons on the detection unit 124. For example, the second dispersive element 128 may be a grating. In another example, one or more lenses may be used to image the received linear-shaped reflecting photons on the detection unit 124.

The detection unit 124 comprises a one-dimensional array of detectors configured to receive the selected one or more wavelength bands and detect the one or more chemicals in the sample based on the selected one or more wavelength bands, each detector of the array of detectors being a single-photon detector having a detection surface having a dimension below 50 μm, the dimension in a direction of the linear-shaped illumination v. For example, the detection surface may have a diameter below 50 μm. In another example, the detection surface may be a square surface, the edges of the square being below 50 μm. In another example, the detection surface may be a rectangular surface, one edge of the rectangle being below 50 μm, the edge being in a direction of the linear-shaped illumination v. For example, the detection surface of the single-photon detectors has a diameter of tens of micrometers. Preferably, the detection surface of the single-photon detectors has a diameter between 10 μm and 50 μm. For example, the detection surface of each single-photon detectors has a diameter of approximately 26 μm. Having small single-photon detectors is advantageous since it enables scaling up the number of parallel measurements, hence having a high imaging speed. That is, the smaller the detector, the faster the imaging speed.

Single-photon detectors are advantageous, in comparison to, for example CCD cameras as, they produce less noise regardless of the readout rate, since single photons are detected directly. In particular, CCD cameras are not direct single-photon detectors, instead incoming photons are converted into electron charges, then these charges are read by the CCD camera electronics. Reading the charges may lead to spurious noise, which increases with faster readout rates in CCD cameras. Additionally, the combination of the DMD-based spectrometer with single-pixel single-photon detectors allows for data compression: CCD cameras are much slower than the present invention because the data transmission bandwidth is limited by current CCD electronics, therefore leading to longer acquisition speeds.

In an example, each of the detectors of the one-dimensional array of detectors 124 may be single-photon avalanche diode detectors (SPADs). For example, the detection unit 124 may comprise SPADs which are be part of a two-dimensional pixelated sensor and may be coupled with a field programmable gate array (FPGA). In an example, micro-lenses may be used to improve the photon collection efficiency of the SPADs. The combination of a two-dimensional pixelated sensor with an FBGA enables processing photon events such as histogram aggregation or coincidence detection. Each of the detectors of the one-dimensional array of detectors 124 receives selected wavelength bands from the DMD. Dimensions of the DMD are adapted to the dimensions of the one-dimensional array of detectors 124. In particular, the spatial light modulator 122 may be configured to select N wavelength bands. The number N of wavelength bands are defined by the spatial light modulator 122. For example, the number N of wavelength bands may be defined by the number of pixels of the DMD in the direction u. Additionally, the one-dimensional array of detectors 124 may comprises M detectors, each of the M detectors being configured to receive a respective wavelength band or a group of wavelength bands of the N wavelength bands. M defines the number of single-photon detectors of the array of detectors. For example, each of the N wavelength bands may represent a chemical to detect in the sample 108 and the spatial light modulator 122 may be configured to select only the N bands representing the respective chemicals. In an example, the spatial light modulator 122 may comprises at least M mirrors configured to direct the N wavelength bands towards the M detectors. The N wavelength bands may comprise spectra corresponding to each of the one or more chemicals. In particular, instead of post-processing the full spectrum emitted by the chemicals comprised in the sample 108, the DMD 122 selects only portions of the full spectrum comprised in different wavelength bands. Each wavelength band comprises a portion of the entire spectrum which may represent a chemical or a combination of chemicals. For example, each portion of the spectrum may be compared for example to a reference spectrum in order to identify the chemical corresponding to the portion of the spectrum, and therefore contained in the sample 108. The spatial light modulator 122 may be configured to use one or more binary mathematical filters to filter the spectra, each of the one or more binary mathematical filters corresponding to each of the one or more chemicals. In particular, binary optical mathematical filters may be used to minimize the chemical detection uncertainty. For example, the method described in U.S. Pat. No. 9,476,824 may be used to optimize the detection of chemicals by using binary optical mathematical filters, while using the elements of the apparatus 100 described above. In another example, the method described in Soldevila et. al, *Fast compressive Raman bio-imaging via matrix completion,* 6, 3, 341-346, *Optica,* 2019 may be used to optimize the detection of chemicals by using spectral filters for chemical quantification. Additionally, lenses 10*a*, 10*b*, 10*c*, 10*d*, 10*e* may be used in the apparatus 100. For example, the lens 10*a* may be used to image the light emitted from the sample 108 when under illumination on the slit 126. The lenses 10*b*, 10*c* may form a telescope to re-image the slit 126 on the DMD 122. The lenses 10*d*, 10*e* may be used to image the DMD 122 on the one-dimensional array of detectors 124.

It should be noted that spatial parallelisation of the system described above enables to speed up the acquisition by $$N_{spad}\frac{PDE_{array}}{PDE_{single\ pixel}},$$

where $N_{SPAD}$ is the number of spatial pixels and PDE is the SPAD photon detection efficiency of the array or a single pixel. Therefore, the system described above, using an array of small detectors enables to achieve higher acquisition speeds than CCD cameras or large single-photon detectors.

Figure 2:
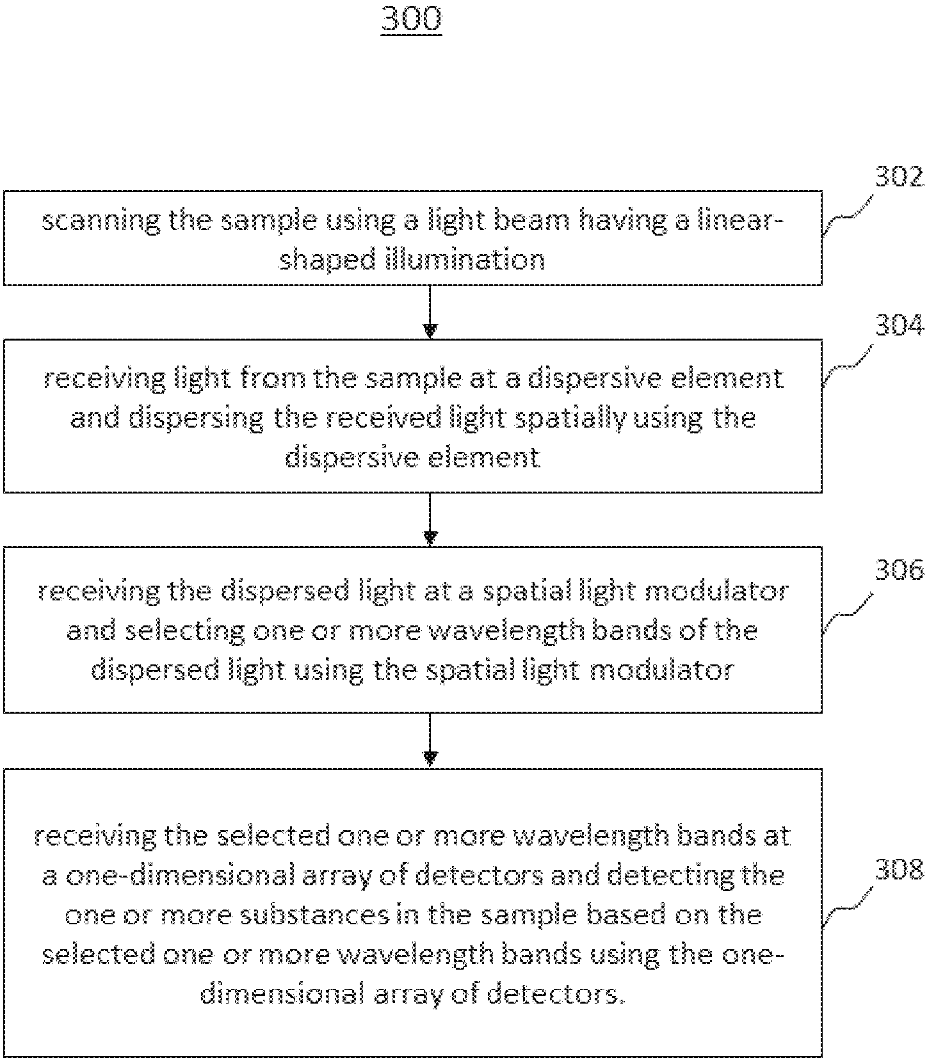
FIG. 2 is a flow diagram depicting a method for parallel detection of one or more chemicals in a sample, according to an example.

FIG. 2 is a flow diagram depicting a method 300 for parallel detection of one or more chemicals in a sample, according to an example. For example, the method 300 may be implemented by the apparatus 100 described above with reference to FIG. 1*a*.

At block 302, the method comprises scanning the sample 108 using a light beam 112 having a linear-shaped illumination. For example, a raster may be used to scan the sample 108.

At block 304, the method comprises receiving light from different points of the sample 108 at a dispersive element 120 and dispersing the received light spatially using the dispersive element 120. For example, the received light may be received at a grating 120.

At block 306, the method comprises receiving the dispersed light at a spatial light modulator and selecting one or more wavelength bands of the dispersed light using the spatial light modulator 122. For example, the spatial light modulator 122 may be a DMD. In an example, the one or more wavelength bands correspond to one or more chemicals comprised in the sample 108.

At block 308 the method comprises receiving the selected one or more wavelength bands at a one-dimensional array of detectors 124 and detecting the one or more chemicals in the sample 108 based on the selected one or more wavelength bands using the one-dimensional array of detectors 124. For example, the detectors 124 may be a SPAD. Each of the detectors 124 of the SPAD may be adapted to detect one chemical. For example, the DMD 122 may select N wavelength bands and each of the detectors 124 may receive one set of the N wavelength bands. Each received wavelength band may comprise a spectrum which can be compared to a reference spectrum (e.g. in a look-up table). A chemical corresponding to the each spectrum may be determined based on the comparison.

The invention described above enables high-speed chemical analysis. In particular, by using a linear-shaped illumination it is possible to achieve a high-speed scan of the sample. Additionally, by using a spatial light modulator in combination with a one-dimensional array of detectors such as single-photon avalanche photodiodes, it is possible to limit-post processing times while analyzing several wavelength bands simultaneously. Additionally, by using single-photon avalanche photodiodes instead of CCD cameras, for example, it is possible to reduce the costs of chemical analysis while improving the speed. Additionally, SPADs enable reading individual time bins at ultrafast time scales, which is not possible for CCD or CMOS cameras, allowing for example lifetime estimation or the extraction of time-of-flight data.

While the invention has been illustrated and described in detail with the help of a preferred embodiment, the invention is not limited to the disclosed examples. Other variations can be deducted by those skilled in the art without leaving the scope of protection of the claimed invention. For example, different lenses may be used with different focal lengths. Additional lenses may be used, depending on the configuration of the apparatus 100. Additionally, other light sources may be used. Further, the apparatus may be implemented to existing Raman spectroscopy apparatuses. Additionally, while the invention has been illustrated for Raman spectroscopy applications, the described apparatus 100 may be used for other applications such as fluorescence, absorption and emission spectroscopy.

The invention claimed is:

1. An apparatus for detecting one or more chemicals in a sample, the apparatus comprising:

a scanning unit comprising a light source configured to scan the sample using a light beam having a linear-shaped illumination;

a dispersive element configured to receive light from the sample and disperse the received light spatially in a parallel manner;

a spatial light modulator configured to receive the dispersed light and select one or more wavelength bands of the dispersed light; and detection unit comprising a one-dimensional array of detectors configured to receive the selected one or more wavelength bands and detect the one or more chemicals in the sample based on the selected one or more wavelength bands, each detector of the array of detectors being a single-photon avalanche diode having a detection surface dimension below 50 μm, the dimension being in a direction of the linear-shaped illumination.

2. The apparatus according to claim 1, wherein the scanning unit is configured to scan the sample with a scanning direction which is different from the direction of the linear-shaped illumination.

3. The apparatus according to claim 2, wherein the dispersive element is on a plane having a first direction corresponding to the direction of the linear-shaped illumination and a second direction corresponding to the scanning direction.

4. The apparatus according to claim 1, wherein the dispersive element is a planar grating.

5. The apparatus according to claim 4, wherein the scanning unit is configured to use a raster scan to scan the sample using the light beam.

6. The apparatus according to claim 1, wherein the spatial light modulator comprises a digital micromirror device.

7. The apparatus according to claim 1, wherein the spatial light modulator is configured to select N wavelength bands and the one-dimensional array of detectors comprises M detectors, each of the M detectors being configured to receive a respective wavelength band of the N wavelength bands.

8. The apparatus according to claim 7, wherein the N wavelength bands comprise spectra corresponding to each of the one or more chemicals.

9. The apparatus according to claim 1, wherein the light received from the sample includes Raman-scattered light.

10. A method for parallel detection of one or more chemicals in a sample, the method comprising:

scanning the sample using a light beam having a linear-shaped illumination;

receiving light from different points of the sample at a dispersive element and dispersing the received light spatially using the dispersive element;

receiving the dispersed light at a spatial light modulator and selecting one or more wavelength bands of the dispersed light using the spatial light modulator; and receiving the selected one or more wavelength bands at a one-dimensional array of detectors and detecting the one or more chemicals in the sample based on the selected one or more wavelength bands using the one-dimensional array of detectors, each detector of the array of detectors being a single-photon avalanche diode having a detection surface a dimension below 50 μm the dimension being in a direction of the linear-shaped illumination.

* * * * *